United States Patent
Kircher

(10) Patent No.: US 8,696,026 B2
(45) Date of Patent: Apr. 15, 2014

(54) STEERING COLUMN FOR A MOTOR VEHICLE

(75) Inventor: Florian Kircher, Renchen (DE)

(73) Assignee: Progress-Werk Oberkirch AG, Oberkirch (DE)

(*) Notice: Subject to any disclaimer, the term of this patent is extended or adjusted under 35 U.S.C. 154(b) by 23 days.

(21) Appl. No.: 13/422,699

(22) Filed: Mar. 16, 2012

(65) Prior Publication Data

US 2013/0068062 A1 Mar. 21, 2013

(30) Foreign Application Priority Data

Mar. 17, 2011 (DE) .......................... 10 2011 015 140

(51) Int. Cl.
*B62D 1/19* (2006.01)

(52) U.S. Cl.
USPC .............................. 280/777; 74/493; 188/371

(58) Field of Classification Search
USPC ............. 280/777, 775; 188/371, 374; 74/493
See application file for complete search history.

(56) References Cited

U.S. PATENT DOCUMENTS

| 5,082,311 | A | * | 1/1992 | Melotik ........................ 280/777 |
| 5,425,553 | A | * | 6/1995 | Yazane et al. ................. 280/777 |
| 5,615,916 | A | * | 4/1997 | Fujiu et al. .................... 280/777 |
| 6,378,903 | B1 | * | 4/2002 | Yabutsuka et al. ............ 280/777 |
| 6,439,357 | B1 | * | 8/2002 | Castellon ...................... 188/374 |
| 7,963,561 | B2 | * | 6/2011 | Waibel et al. ................. 280/777 |
| 2008/0229867 | A1 | | 9/2008 | Waibel et al. |

FOREIGN PATENT DOCUMENTS

| DE | 102005052123 | 1/2007 |
| DE | 4138239 | 4/2012 |
| DE | 10008523 | 4/2012 |
| DE | 102005052123 | 4/2012 |

* cited by examiner

*Primary Examiner* — Ruth Ilan
(74) *Attorney, Agent, or Firm* — Reising Ethington P.C.

(57) ABSTRACT

A motor vehicle steering column having an energy-absorbing device that includes a first element and a second element which engages the first element and moves with respect thereto during a vehicle impact to carry out mechanical deformation that absorbs energy. The first element is an elongated metal plate which extends in the longitudinal direction of the steering column and the second element has at least one guide element which is guided along the first element during a relative movement of the first and second elements and in so doing deforms the first element. The guide element is guided along an outer side of one of the longitudinal edges of the metal plate and engages therewith, which longitudinal edges extend in the longitudinal direction of the steering column.

11 Claims, 4 Drawing Sheets

STEERING COLUMN FOR A MOTOR VEHICLE

CROSS REFERENCE TO FOREIGN APPLICATION

This application claims priority from German patent application No. 10 2011 015 140.0 filed on Mar. 17, 2011. The entire contents of this priority application is incorporated herein by reference.

BACKGROUND OF THE INVENTION

The invention relates to steering columns for motor vehicles, which comprise an energy-absorbing device which becomes effective in the event of an impact of the motor vehicle.

A steering column is a component of the steering mechanism in motor vehicles. The steering column is typically a rod- or tube-shaped carrier which is connected at the upper end to the steering wheel and transmits the movements of said steering wheel to the steering linkage of the vehicle wheels. The steering column is located in the centre in front of the driver's seat and extends inclined from the position of the steering wheel towards the front downwards to the steering linkage.

As in the case of the steering column of the type mentioned above, steering columns are embodied in the manner of a telescope, so that in the event of a frontal impact of the motor vehicle the steering wheel can be displaced away from the driver, by virtue of parts of the steering column sliding one inside the other in a decelerated manner, in order to alleviate the consequences for the driver when impacting the steering wheel.

For this purpose, the steering column of the type mentioned above is provided with at least one energy-absorbing device which becomes effective in the event of an impact of the motor vehicle.

A steering column in accordance with DE 10 2005 052 123 B3 comprises two energy-absorbing devices which become effective in the event of an impact of the motor vehicle and are arranged, offset by 180° around the longitudinal direction of the steering column, on the steering column casing tube. Each of the two devices comprises a first element which is embodied as an elongated metal plate in which is embodied an elongated hole. A second element engages with the first element, the second element being embodied as a bolt which engages in the elongated hole of the first element. The elongated hole of the first element extends in the longitudinal direction of the steering column. The bolt which is arranged in the manner of a slider in the elongated hole comprises an elongated round shape, wherein a guide element in the form of a lateral enlargement is embodied respectively on the two longitudinal edges of the bolt. During normal operation of the motor vehicle, the first element and the second element are located in a rest position, in which the lateral enlargements of the bolt protrude into enlargements of the elongated hole of the first element, thus producing an at least partial form fit. The bolt is prevented in this manner from displacing with respect to the elongated hole during normal operation.

In the event of an impact of the motor vehicle (also referred to as a crash), the bolt deforms the elongated hole, in that the lateral enlargements of the bolt expand the elongated hole, while the bolt is displaced in the elongated hole relative thereto. Thus, in the case of this device, the steering column moves one inside the other in a telescopic and decelerated manner, causing the steering wheel to move away from the driver. Thus, the bolt executes deformation work on the first element, in that the bolt expands the elongated hole transverse to the longitudinal direction, as a result of which mechanical energy from the impact is absorbed.

However, the energy-absorbing devices of the known steering column have disadvantages.

As a result of embodying the first element as a metal plate with an elongated hole, which is through-going perpendicular to the plane of the metal plate and extends in the longitudinal direction of the metal plate, the metal plate is provided between its longitudinal ends with two material webs which extend in the longitudinal direction and are relatively thin. If this metal plate is now welded, for example by laser welding, for example to the casing tube which surrounds the steering wheel shaft, it is possible that the aforementioned material webs of the metal plate distort, as a result of which the mutual spacing between the material webs and at the same time the hole width of the elongated hole is reduced or enlarged at some locations over the length of the metal plate. This means that the width of the elongated hole, as seen over the length of the metal plate, is subject to excessive tolerances which accompany corresponding tolerances in the absorption of impact loading and thus the energy absorption.

In addition, the embodiment of the energy-absorbing device of the known steering column has the disadvantage not only that excessive tolerances are produced by the fastening of the metal plate to the underlying material, but also that it is not easy to control the process of implementing the elongated hole in the metal plate with respect to tolerances.

SUMMARY OF THE INVENTION

An object of the invention is therefore to develop a steering column of the type mentioned in the introduction to such an extent that the energy-absorbing device is less affected by tolerances and thus the safety aspect of the steering column during an impact is further improved.

According to an aspect of the invention, a steering column for a motor vehicle is provided, comprising at least one energy-absorbing device which becomes effective in the event of an impact of the motor vehicle, the device comprising a first element embodied as an elongated metal plate extending in a longitudinal direction of the steering column, the metal plate comprising a first end, a second end, a first longitudinal edge having a first outer side and a second longitudinal edge having a second outer side and a central longitudinal axis between the first and second longitudinal edges, the first and second longitudinal edges extending in the longitudinal direction of the steering column from the first end to the second end, and a second element engaging with the first element and having at least one guide element, the at least one guide element engaging with the first outer side of the first longitudinal edge of the metal plate, the first element and the second element being arranged in a rest position unable to move with respect to each other during normal operation of the vehicle, the first element and the second element can be displaced relative to each other in the longitudinal direction of the steering column in the event of an impact of the vehicle, the at least one guide element being guided during a relative displacement of the first and second element along the first outer side of the first longitudinal edge and thereby deforming the first element.

In the case of the energy-absorbing device of the steering column in accordance with the invention, the at least one guide element of the second element is thus no longer guided in an elongated hole of the first element, but rather the at least one guide element engages with the first element on an outer side of one of the longitudinal edges of the first element embodied as a metal plate and is guided on this outer side of the longitudinal edge in the event of an impact of the motor vehicle and in so doing executing deformation work on the metal plate. Thus, the deformation work does not constitute an expansion of an elongated hole, as in the case of the known steering column, but rather a displacement of material from the longitudinal edge towards the central longitudinal axis of the metal plate. The grade of the absorption of impact loading as the second element is displaced relative to the first element is determined in the case of the steering column in accordance with the invention by the width dimension of the metal plate forming the first element. This width dimension is considerably less sensitive to tolerances when producing the first element, for example by stamping, than when implementing an elongated hole in the metal plate. The steering column in accordance with the invention thus comprises an energy-absorbing device which is less affected by tolerances.

In a preferred embodiment, the metal plate is at least nearly closed between its longitudinal edges.

"At least nearly closed" means here that the metal plate is embodied substantially or fully without through holes or openings. As a consequence, the further advantage is produced that, as the metal plate is being fastened to an underlying material, for example to the casing tube of the steering column, it does not distort at all as a result of the fastening process, for example during laser welding, or it distorts to a considerably lesser extent than when the metal plate is embodied with an elongated hole as in the case of the known steering column, as a result of which tolerances are further reduced.

In a further preferred embodiment, the second element comprises at least one second guide element which engages with an outer side of the other longitudinal edge of the metal plate and is guided along this outer side.

In this embodiment, the at least two guide elements grip the metal plate from the outside, and in the event of an impact of the motor vehicle the at least two guide elements deform the metal plate towards the central longitudinal axis of the metal plate by reducing the width dimension.

In this context, it is preferred when the first and the second guide element are arranged immediately opposite with respect to a central longitudinal axis of the metal plate.

It is advantageous here that the second element is guided along the outer sides of the longitudinal edges of the metal plate whilst reducing the risk of tilting, which can lead to the second element becoming jammed during its movement relative to the first element.

In a further preferred embodiment, the at least one guide element engages in the rest position by means of an at least partial form fit with the outer side of the one longitudinal edge of the metal plate, wherein the at least partial form fit can be overcome in the event of an impact.

This feature which is also provided per se in the known steering column can also be used advantageously in the case of the steering column in accordance with the invention to ensure that the second element is sufficiently fixed relative to the first element during normal operation of the motor vehicle.

In a further preferred embodiment, the at least one guide element is embodied as a bolt which is rounded on its side facing the longitudinal edge, on which it is guided, of the metal plate.

In this embodiment, the at least one guide element can be embodied for example as a semi-cylindrical bolt, whose round side lies against the outer side of a longitudinal edge of the metal plate. By virtue of the fact that the at least one guide element is rounded on its side facing the longitudinal edge, on which it is guided, of the metal plate, this embodiment has the advantage that the guide element is prevented from tilting with the outer side of the longitudinal edge of the metal plate or that the risk of tilting is at least reduced, so that the relative movability between the at least one guide element and the longitudinal edge of the metal plate in the event of an impact is facilitated.

In a further preferred embodiment, a width dimension of the metal plate which is taken perpendicular to the longitudinal direction from the outer side of one longitudinal edge towards the outer side of the other longitudinal edge is variable starting from the rest position in the longitudinal direction of the metal plate, the width dimension preferably increasing.

It is advantageous here that the absorption of impact loading is variable, in particular increases, over the displacement path of the first element relative to the second element. Preferably, the width dimension increases continuously starting from the initial position in the longitudinal direction of the metal plate.

In a further preferred embodiment, the second element comprises a plate which is arranged as a rider on the first element, wherein the at least one guide element protrudes from the plate in the direction towards the first element.

This embodiment has the advantage that the arrangement of the first element and second element produces a compact construction of the energy-absorbing device.

Preferably, the at least one guide element is embodied in one piece with the plate.

In a further preferred embodiment, the metal plate comprises on its side facing the second element a recess which extends in the longitudinal direction, so that the longitudinal edges of the metal plate are raised with respect to a region between the longitudinal edges.

It is advantageous here that, in the event of an impact of the motor vehicle, when the second element owing to its movement relative to the first element executes deformation work on said first element, material from the metal plate can be displaced from the region of its longitudinal edges into the recess, whereby the risk of an undesired jamming of the relative movability between the first element and the second element is reduced in the event of an impact.

It is further preferred that the metal plate comprises on its side remote from the second element a web which is raised in the direction away from the second element and extends in the longitudinal direction of the steering column between the longitudinal edges of the metal plate.

This feature also has the advantage that material from the metal plate can be displaced from the region of its longitudinal edges into the free space between the web and the longitudinal edges, when the second element owing to its movement relative to the first element executes deformation work on the latter. The risk of an undesired jamming of the relative movability between the first element and the second element is likewise reduced as a result.

In accordance with a further preferred embodiment, the first element is attached, fixedly with respect to the steering column, to a casing tube surrounding a steering wheel shaft and the second element is attached fixedly with respect to the chassis.

In this context, it is further preferred that the metal plate is fastened only on its longitudinal ends to the casing tube.

It is advantageous here that the process of fastening the metal plate can be performed with a small amount of time being expended and thus in a cost-effective manner, because the metal plate is fastened only on its longitudinal ends to the casing tube. A further advantage resides in the fact that sensitivity of the energy-absorbing device to tolerances is further reduced, whereas, for example when fastening, in particular welding, the metal plate over its entire length to the casing tube, distortions and thus tolerances can occur, even if on the basis of the present invention, in particular when the metal plate is closed, the risk of distortion is already considerably reduced.

Further features and advantages are evident from the following description and the attached drawing.

It will be understood that the aforementioned features and the features yet to be explained below can be used not only in the respective combination mentioned but also in other combinations or stand-alone, without departing from the scope of the present invention.

BRIEF DESCRIPTION OF THE DRAWINGS

An exemplary embodiment of the invention is illustrated in the drawings and is described hereinunder in further detail with reference to said drawings, in which:

FIG. 1 shows a detail of a steering column for a motor vehicle in the region of an energy-absorbing device for absorbing energy in the event of an impact of the motor vehicle, wherein FIG. 1 illustrates a perspective view of the steering column;

DESCRIPTION OF A PREFERRED EXEMPLARY EMBODIMENT

Figure 1:
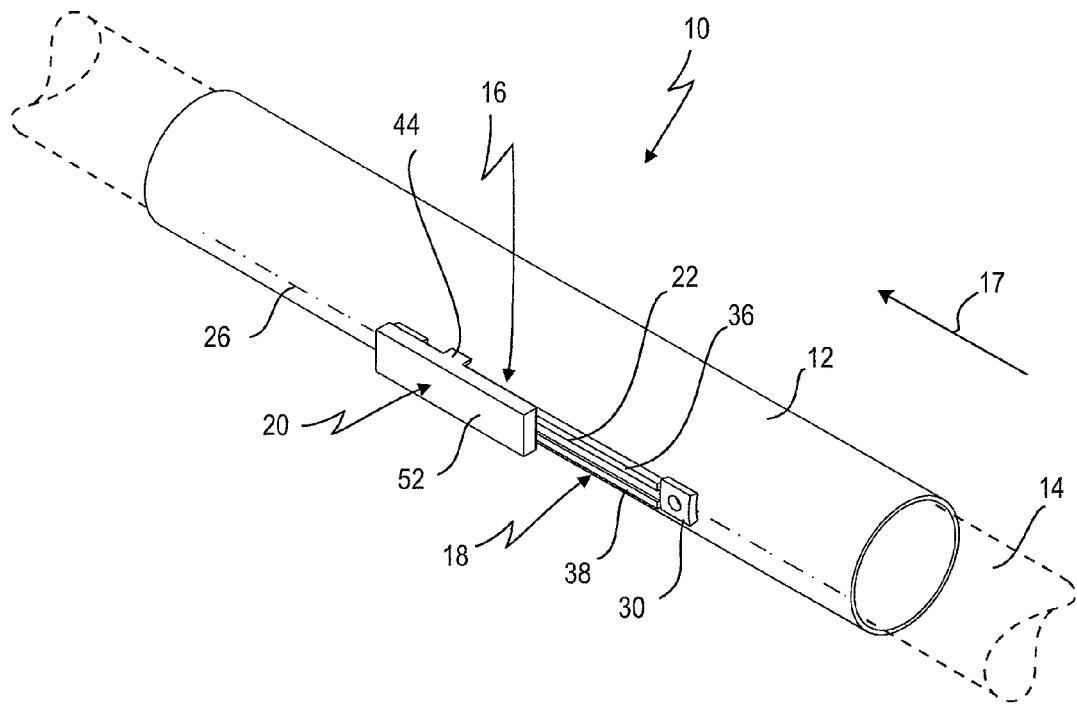

FIG. 1 shows a detail of a steering column for a motor vehicle (not illustrated), said steering column being illustrated with the general reference numeral 10. The steering column 10 is shown in FIG. 1 in the region of a casing tube 12, through which a steering wheel shaft 14 (illustrated only in FIG. 1) passes. The steering wheel shaft 14 is likewise only represented in detail form in FIG. 1. The steering wheel shaft 14 is connected on the side on the right in FIG. 1 to a steering wheel (not illustrated) of the motor vehicle and on the other side, on the left in FIG. 1, to a steering linkage (not illustrated) of the motor vehicle.

The steering column 10 comprises an energy-absorbing device which is provided with the general reference numeral 16 and which, in the event of an impact of the motor vehicle in which the steering column is installed, becomes effective to render it possible that the steering column including the casing tube 12 and the steering wheel shaft 14 can be displaced away from the driver whilst absorbing the loading from the impact, as is indicated by an arrow 17 in FIG. 1.

In addition, the energy-absorbing device 16 is described in further detail hereinunder with reference to FIGS. 2 to 10.

The device 16 comprises a first element 18 and a second element 20 which engages with said first element.

The first element 18 is embodied as an elongated metal plate 22 which comprises a central longitudinal axis 24. The metal plate extends in the direction of a longitudinal direction 26 of the steering column 10.

Figure 3:
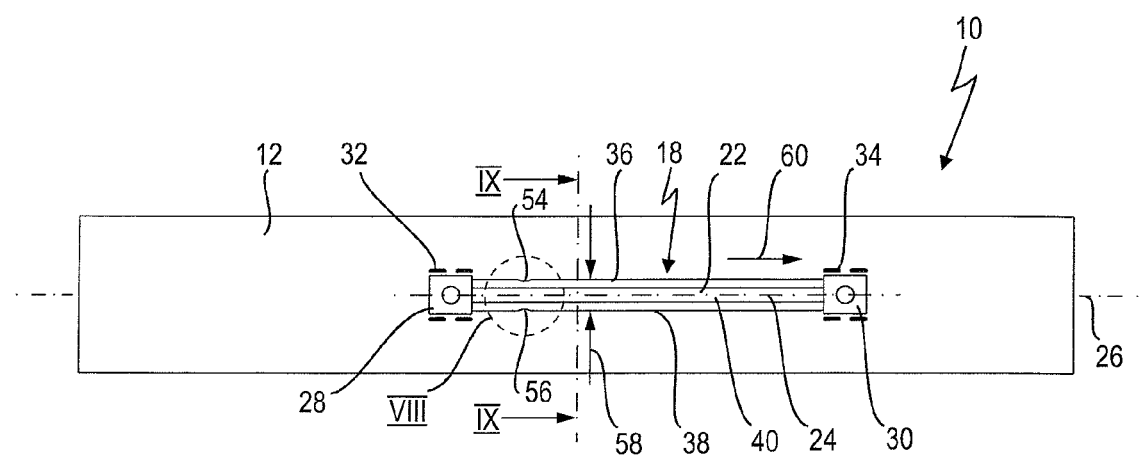
FIG. 3 shows a further lateral view of the steering column as shown in FIG. 2, but where a part of the energy-absorbing device has been omitted.
Figure 4:
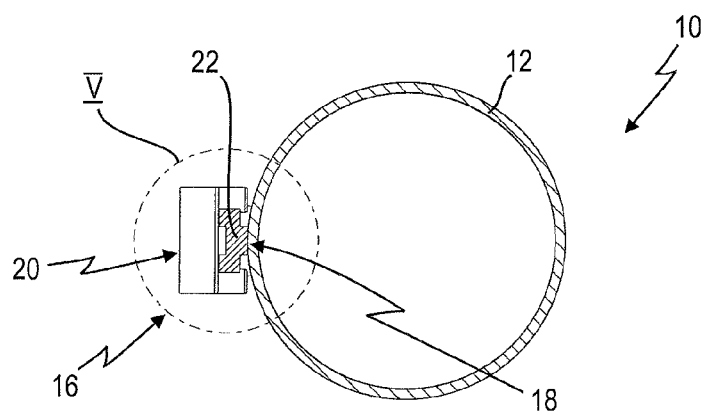
FIG. 4 shows a cross-sectional view along the line IV-IV in FIG. 2.
Figure 5:
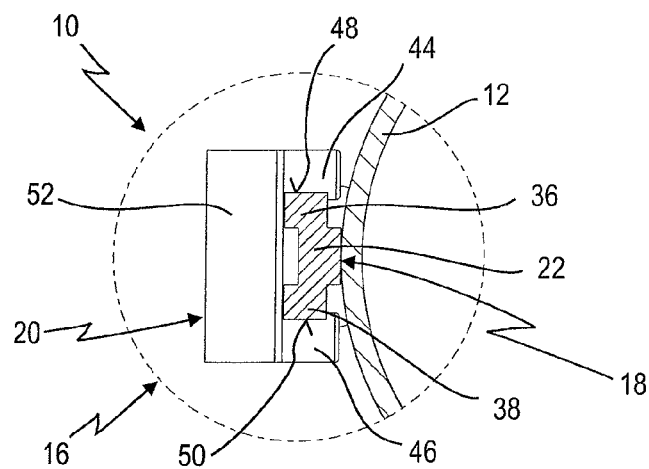
FIG. 5 shows a detail V in FIG. 4, in an enlarged scale with respect to FIG. 4.
Figure 6:
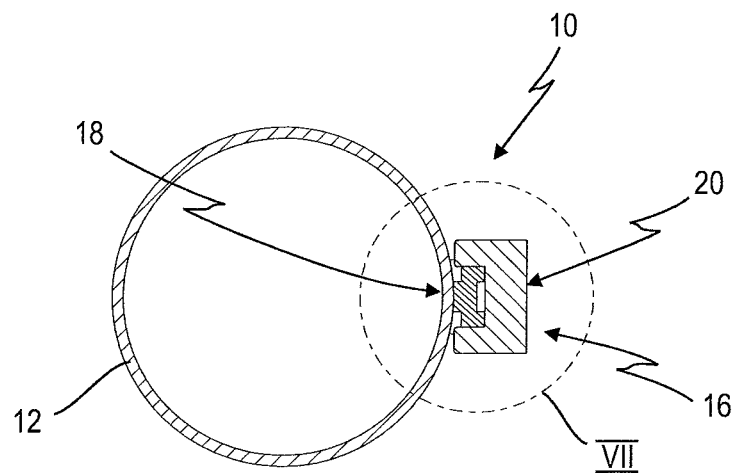
FIG. 6 shows a cross-sectional view along the line VI-VI in FIG. 2.
Figure 7:
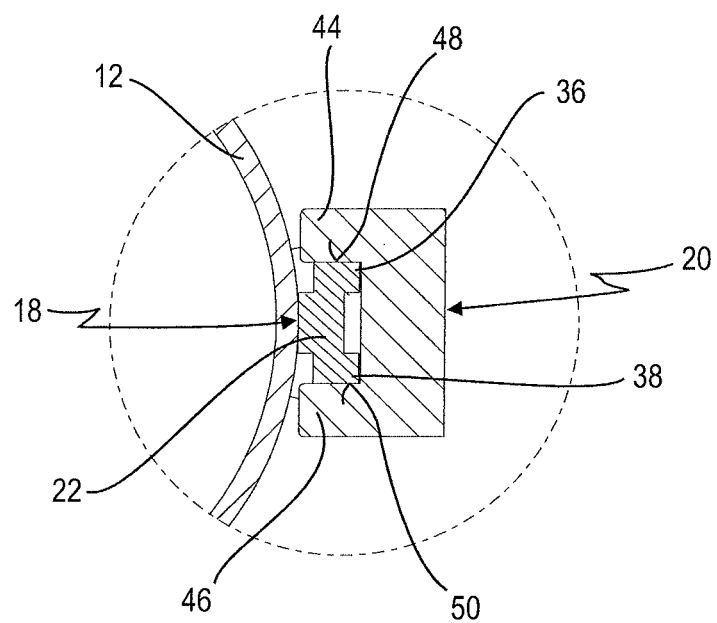
FIG. 7 shows a detail VII in FIG. 6, in an enlarged scale with respect to FIG. 6.

FIG. 3 shows the first element 18 in the form of the metal plate 22 without the second element 20.

The metal plate 22 comprises on its longitudinal ends in each case a connecting element 28 and 30, by means of which the metal plate 22 is fastened to the outer side of the casing tube 12. For fastening purposes, each of the connecting elements 28 and 30 can be welded to the outer side of the casing tube 12, for example by way of four weld regions 32 and 34, which are indicated in FIG. 3 by the broken line.

The metal plate comprises between the connecting elements 28 and 30 longitudinal edges 36 and 38 which extend in the direction of the central longitudinal axis 24, or likewise in the longitudinal direction 26. The metal plate 22 is at least nearly closed in the region between the longitudinal edges 36 and 38, i.e. the metal plate 22 is substantially free from through holes or openings in the region between the connecting elements 28, 30 and the longitudinal edges 36, 38 and in the exemplary embodiment illustrated it is actually completely free from through holes or openings.

Figure 10:
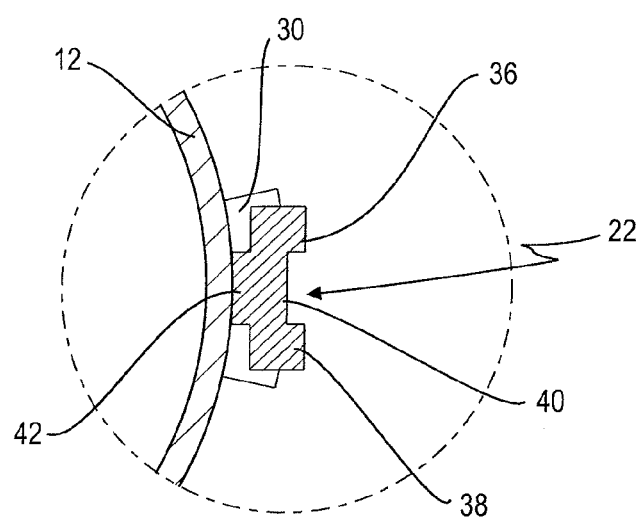
FIG. 10 shows a detail X in FIG. 9, in an enlarged scale with respect to FIG. 9.

FIG. 10 shows the metal plate 22 in the cross-sectional view perpendicular to the central longitudinal axis 24, or likewise to the longitudinal direction 26.

As is evident from FIG. 10, the metal plate 22 comprises a recess 40 on the side remote from the casing tube 12, so that the longitudinal edges 36 and 38 are raised with respect to the recess 40. The recess 40 extends between the two connecting elements 28, 30 over the entire length of the longitudinal edges 36 and 38.

The metal plate 22 can be fastened to the casing tube 12 exclusively by means of the connecting elements 28, 30, it is, however, also possible to fasten the metal plate 22 in addition to the casing tube 12, for example by welding, along a web 42 facing the casing tube 12, which web likewise extends over the entire length of the metal plate 22 between the longitudinal edges 36 and 38.

Fundamentally, however, it is sufficient to fasten the metal plate 22 to the casing tube 12 by means of the connecting elements 28 and 30 alone.

The second element 20 of the energy-absorbing device 16 comprises at least one, in this case two, guide elements 44, 46 (cf. in particular FIGS. 4 to 7). Here, the guide elements 44 and 46 engage with corresponding outer sides 48 and 50 of the longitudinal edges 36, 38 of the metal plate 22.

The second element 20 comprises a plate 52 from which the guide elements 44 and 46 protrude in the direction towards the first element 18. As is evident from FIG. 7, the second element 20 comprises in the region of the guide elements 44 and 46 a C-shaped cross section. The second element 20 sits as a rider on the first element 18.

The guide elements 44 and 46 are embodied as bolts in each case with a semi-cylindrical shape, wherein the rounded sides of the guide elements 44 and 46 engage with the outer sides 48 and 50 of the longitudinal edges 36 and 38 of the metal plate 22.

Whereas the first element 18 of the energy-absorbing device 16 in the illustrated exemplary embodiment is fastened fixedly with respect to the steering column, in that it is fastened to the casing tube 12 of the steering column 10, the second element 20 is attached fixedly with respect to the chassis, or rather the second element 20 is fastened to a carrier part (not illustrated) which is fixed to the chassis.

Figure 2:
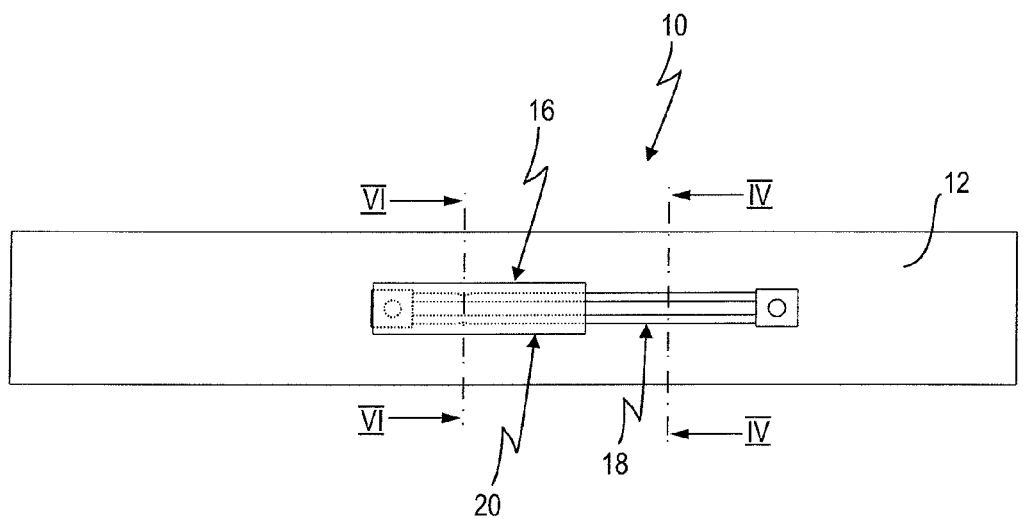
FIG. 2 shows a lateral view of the steering column in FIG. 1.

FIGS. 1 and 2 show the steering column 10 and the energy-absorbing device 16 during the normal operation of the vehicle in which the steering column 10 is installed. During the normal operation of the vehicle, the first element 18 and the second element 20 are located in a position relative to each other which is described here as the rest position. In this rest position, the second element 20 is located on that end of the first element 18 which is on the side towards the steering linkage, or rather on the end remote from the steering wheel.

Figure 8:
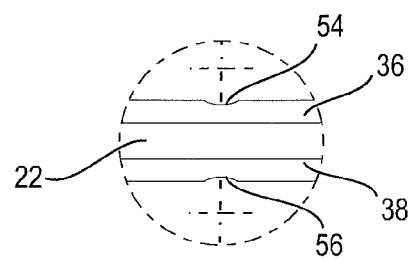
FIG. 8 shows a detail VIII in FIG. 3.
Figure 9:
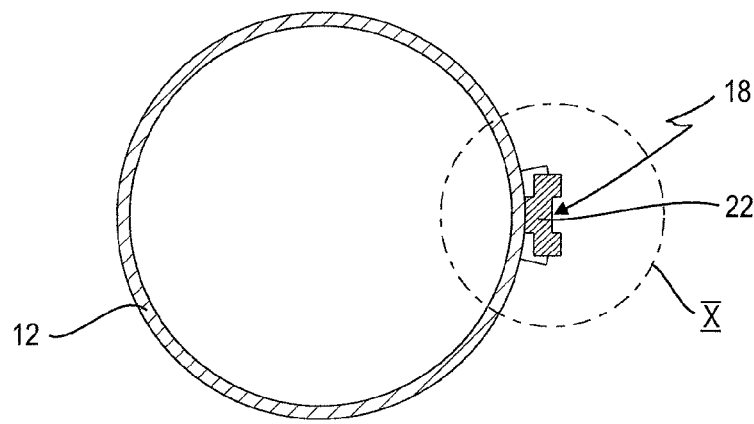
FIG. 9 shows a cross-sectional view along the line IX-IX in FIG. 3.

In order to hold the second element 20 and the first element 18 in this rest position in which they are unable to move with respect to each other, a respective recess or narrowing 54 and 56 is provided on the longitudinal edges 36 and 38 of the metal plate 22, as shown in FIGS. 3 and 8, and the guide elements 44 and 46, which are correspondingly rounded on their sides facing the longitudinal edges 36 and 38, engage at least partially with a form fit in the said recesses.

In the illustrated exemplary embodiment, the guide element 44 and the guide element 46 are arranged immediately opposite with respect to the central longitudinal axis 24 of the metal plate 22, the recesses 54 and 56 are likewise embodied accordingly immediately opposite with respect to the central longitudinal axis 24 on the longitudinal edges 36 and 38.

In the event of an impact of the motor vehicle in which the steering column 10 is installed, the energy-absorbing device 16 allows a relative movement between the first element 18 and the second element 20 and thus a movement of the steering column 10 away from the driver. In so doing, the metal plate 22 forming the first element 18 is displaced, together with the casing tube 12 and the steering wheel shaft 14, in the direction of the arrow 17 (FIG. 1) relative to the fixed second element 20, wherein the guide elements 44, 46 initially disengage from the recesses 54 and 56 on the longitudinal edges 36 and 38 of the metal plate 22 and are then guided along the outer sides 48 and 50 of the longitudinal edges 36 and 38 of the metal plate 22. As the guide elements 44, 46 are guided along the outer sides 48 and 50, they deform the longitudinal edges 36, 38 of the metal plate 22 towards the central longitudinal axis 24. Thus, the deformation of the metal plate 22 does not constitute here an expansion of an elongated hole, as in the case of the known steering column, but rather a pressing together of the metal plate 22 towards the central longitudinal axis 24.

The recess 40 in the metal plate 22 and the web 42 of the metal plate 22, which web provides a spacing between the longitudinal edges 36 and 38 and the casing tube 12 (cf. FIG. 10), render it possible for material in the longitudinal edges 36 and 38 to be displaced into the free spaces thus formed.

A width dimension 58 of the metal plate 22, which is taken transverse to the longitudinal direction 26 or likewise to the central longitudinal axis 24 between the outer sides 48 and 50 of the longitudinal edges 36 and 38 of the metal plate 22, can be embodied such that it is variable, in particular that it increases, i.e. the metal plate 22 widens in this case from the recesses 54, 56 defining the rest position towards the connecting element 30 in the longitudinal direction of the metal plate 22 in the direction of an arrow 60 which is the direction of the relative movement of the second element 20 in the event of an impact. As a consequence, the absorption of impact loading can be implemented such that it is variable over the length of the metal plate 22, i.e. the energy absorption per unit of distance traveled increases with the increasing relative movement between the first element 18 and the second element 20.

It will be understood that the steering column 10 can comprise not only one energy-absorbing device 16, but rather a plurality of, for example two, devices of this type can also be provided at peripheral positions, offset by 180°, of the steering column 10.

What is claimed is:

1. A steering column for a motor vehicle, comprising at least one energy-absorbing device which becomes effective in the event of an impact of the motor vehicle, the device comprising
   - a first element embodied as an elongated metal plate extending in a longitudinal direction of the steering column, the metal plate comprising a first end, a second end, a first longitudinal edge having a first outer side and a second longitudinal edge having a second outer side and a central longitudinal axis between the first and second longitudinal edges, the first and second longitudinal edges extending in the longitudinal direction of the steering column from the first end to the second end, and
   - a second element engaging with the first element and having at least one guide element, the at least one guide element engaging with the first outer side of the first longitudinal edge of the metal plate and having a bolt shape which is rounded on its side facing the first outer side of the first longitudinal edge of the metal plate,
   - the first element and the second element being arranged in a rest position unable to move with respect to each other during normal operation of the vehicle,
   - the first element and the second element can be displaced relative to each other in the longitudinal direction of the steering column in the event of an impact of the vehicle, the at least one guide element being guided during a relative displacement of the first and second element along the first outer side of the first longitudinal edge and thereby deforming the first element.

2. The steering column of claim 1, wherein the metal plate is at least nearly closed between the first and second longitudinal edges.

3. The steering column of claim 1, wherein the at least one guide element is a first guide element, and the second element comprises a second guide element which engages with the second outer side of the second longitudinal edge of the metal plate and is guided along the second outer side.

4. The steering column of claim 3, wherein the first and the second guide elements are arranged immediately opposite with respect to the central longitudinal axis of the metal plate.

5. The steering column of claim 1, wherein the at least one guide element engages, in the rest position, with the first outer side of the first longitudinal edge of the metal plate with an at least partial form fit, wherein the at least partial form fit can be overcome in the event of an impact.

6. The steering column of claim 1, wherein a width dimension of the metal plate which is taken perpendicular to the central longitudinal axis from the first outer side of the first longitudinal edge towards the second outer side of the second longitudinal edge is variable starting from the rest position in the longitudinal direction of the metal plate.

7. The steering column of claim 6, wherein the width dimension of the metal plate which is taken perpendicular to the central longitudinal axis from the first outer side of the first longitudinal edge towards the second outer side of the second longitudinal edge is increasing starting from the rest position in the longitudinal direction of the metal plate.

8. The steering column of claim 1, further comprising a casing tube surrounding a steering wheel shaft, wherein the first element is attached to the casing tube.

9. The steering column of claim 8, wherein the metal plate of the first element is fastened only on the first and second ends to the casing tube.

10. A steering column for a motor vehicle, comprising at least one energy-absorbing device which becomes effective in the event of an impact of the motor vehicle, the device comprising:
- a first element embodied as an elongated metal plate extending in a longitudinal direction of the steering column, the metal plate comprising a first end, a second end, a first longitudinal edge having a first outer side and a second longitudinal edge having a second outer side and a central longitudinal axis between the first and second longitudinal edges, the first and second longitudinal edges extending in the longitudinal direction of the steering column from the first end to the second end, and
- a second element engaging with the first element and having at least one guide element, the at least one guide element engaging with the first outer side of the first longitudinal edge of the metal plate,
- the first element and the second element being arranged in a rest position unable to move with respect to each other during normal operation of the vehicle,
- the first element and the second element can be displaced relative to each other in the longitudinal direction of the steering column in the event of an impact of the vehicle, the at least one guide element being guided during a relative displacement of the first and second element along the first outer side of the first longitudinal edge and thereby deforming the first element,
- wherein the second element comprises a plate which is arranged as a rider on the first element, wherein the at least one guide element protrudes from the plate of the second element in direction towards the first element; and
- wherein the metal plate of the first element comprises, on a side of the metal plate which is remote from the second element, a web which is raised in direction away from the second element and extends in the longitudinal direction of the steering column between the first and second longitudinal edges of the metal plate.

11. The steering column of claim 10, wherein the metal plate of the first element comprises, on a side of the metal plate which faces the second element, a recess which extends in the longitudinal direction, wherein the first and second longitudinal edges of the metal plate are raised with respect to a region between the first and second longitudinal edges.

* * * * *